United States Patent
Netherton

(10) Patent No.: US 7,534,754 B2
(45) Date of Patent: May 19, 2009

(54) CONCRETE CLEANING AND PREPARATION COMPOSITION

(75) Inventor: Jason J. Netherton, Kenosha, WI (US)

(73) Assignee: Valspor Sourcing, Inc., Minneapolis, MN (US)

( * ) Notice: Subject to any disclaimer, the term of this patent is extended or adjusted under 35 U.S.C. 154(b) by 323 days.

(21) Appl. No.: 10/945,165

(22) Filed: Sep. 20, 2004

(65) Prior Publication Data

US 2006/0063689 A1    Mar. 23, 2006

(51) Int. Cl.
  C11D 1/00    (2006.01)
  C11D 3/32    (2006.01)
  C11D 3/43    (2006.01)
(52) U.S. Cl. .................. 510/240; 510/421; 510/501; 510/506
(58) Field of Classification Search .................. 510/240, 510/421, 501, 506
See application file for complete search history.

(56) References Cited

U.S. PATENT DOCUMENTS

| | | | |
|---|---|---|---|
| 5,112,393 A | 5/1992 | Engel et al. | |
| 5,672,279 A | 9/1997 | Sargent et al. | |
| 5,698,021 A | 12/1997 | Dorsett | |
| 5,885,339 A | 3/1999 | Dorsett | |
| 5,951,784 A | 9/1999 | Hawes | |
| 6,153,571 A * | 11/2000 | Komocki et al. | 510/190 |
| 6,340,660 B1 * | 1/2002 | Gastgaber | 510/255 |
| 6,540,943 B1 * | 4/2003 | Treybig et al. | 252/391 |
| 2002/0028288 A1 | 3/2002 | Rohrbaugh et al. | |
| 2002/0045010 A1 | 4/2002 | Rohrbaugh et al. | |
| 2002/0102359 A1 | 8/2002 | Rohrbaugh et al. | |
| 2002/0108640 A1 | 8/2002 | Barger et al. | |
| 2002/0176982 A1 | 11/2002 | Rohrbaugh et al. | |
| 2003/0022803 A1 * | 1/2003 | Mayhall et al. | 510/218 |
| 2003/0034051 A1 | 2/2003 | Barger et al. | |
| 2005/0003990 A1 * | 1/2005 | Smith et al. | 510/421 |
| 2005/0032668 A1 * | 2/2005 | Pedersen et al. | 510/499 |

OTHER PUBLICATIONS

B. Fultz, "Using Citric Acid to Clean Concrete," *J. Protect. Coat. Linings*, vol. 18, No. 11, Nov. 2001, pp. 53-56.
Laidlaw, "An Alternative to Muriatic Acid for Etching Concrete," *J. Protect. Coat. Linings*, vol. 6, No. 2, Feb. 1989, pp. 31-32.
S. O'Connor, "Using Chemicals to Clean and Prepare Concrete for Coating," *J. Protect, Coat. Linings*, vol. 14, No. 11, Nov. 1997, pp. 61-64.
ViHib MSI Tech Data Sheet and Material Safety Data Sheet, Vitech International Inc., Apr. 2003, 6 pages.
Videt Q-3, Tech Data Sheet, Vitech International Inc., Apr. 2003, 8 pages.
Vitech BJS-I Acid Replacement Technology, Tech Data Sheet, Vitech International Inc., Apr. 2003, 16 pages.
Kaboom Shower, Tub and Tile Cleaner—Soap Scum Remover, Material Safety Data Sheet, http://www.greatcleaners.com/ogi_retail/product.asp?catalog%5Fname=ogi&product%5Fid=17511, printed Jul. 21, 2005, 6 pages.
Prosoco, Inc., Enviro Klean® Safety Klean, Product Data Sheet, Material Safety Data Sheet, and Architectural Specification, http://www.prosoco.com/Product.asp?ID=229, printed Jun. 27, 2005, 9 pages.
Prosoco, Inc., Enviro Klean® SafEtch, Product Data Sheet and Material Safety Data Sheet, http://www.prosoco.com/Products.asp?ID=239, printed Jun. 27, 2005, 7 pages.
J. Netherton, "Scratch Where It Etches . . . ," A Dissertation of Available Solutions for Chemically Preparing Concrete for Thin Film Coatings, Mar. 16, 2004, 4 pages.
G. Kunzik and J. Netherton, "World of Concrete 2004 Seminar and Exposition Synopsis," Orange County Convention Center, Orlando, FL, Feb. 18-20, 2004, 3 pages.

* cited by examiner

*Primary Examiner*—Gregory R Del Cotto
(74) *Attorney, Agent, or Firm*—Shumaker & Sieffert, P.A.

(57) ABSTRACT

A concrete cleaning and preparation composition is described, which includes urea hydrochloride, surfactant, water, and one or more glycol ethers. Also described is a method of preparing a concrete surface, including pre-wetting a concrete surface, using a cleaning and preparation composition, including urea hydrochloride, a surfactant, water, and one or more glycol ethers, and rinsing the concrete surface. Furthermore, a kit for cleaning, preparing, and coating concrete including a cleaning and preparation composition including urea hydrochloride, and a coating is also described.

14 Claims, No Drawings

CONCRETE CLEANING AND PREPARATION COMPOSITION

TECHNICAL FIELD

This invention relates to concrete etching and cleaning.

BACKGROUND

Homeowners are becoming more conscious about the appearance of the garage area. In addition to finished walls and storage locations, another area of desired improvement is the floor of the garage. Rather than just accepting a bare concrete surface, homeowners are looking for a strong, durable, stylish finish. This is often attained by staining, painting, or sealing the garage floor.

The concrete floor should first be prepared prior to applying a finishing treatment. Often, the treatment is applied after at least several years of use of the concrete floor. The years of use have resulted in the accumulation of dirt, grease, and stains of various kinds. Preferably, these accumulations will be removed, and the concrete prepared, before the concrete surface is ready for the finishing treatment.

A variety of materials have been used to clean and prepare concrete surfaces. Cleaning solutions are available and have been used in attempts to clean the concrete surface before painting or coating. Cleaners that have been used include water, liquid detergents, and solvents such as paint thinners and alcohols. Cleaning a concrete surface includes removing dirt, grime, grease, and oils from the surface. Therefore, combinations of cleaners can be employed in stages. For example, the approach might be to first wash the surface using detergent and water, followed by a second wash using a specialty cleaner and concentrating on the grease and oil spots.

Fully preparing a concrete surface for finishing requires more than just cleaning. The surface of concrete may be rather hard and smooth, and often does not provide the roughness necessary for a paint or coating to adhere properly. The surface should first be roughened in order to provide a suitable surface for adhesion. The surface may be roughened using physical or chemical roughening treatments. Physical treatments to prepare a concrete surface include sandblasting and shot blasting, both of which use abrasive materials forced through a nozzle under pressure to physically abrade the concrete surface. This physical abrasion provides a surface enabling a coating with good adhesion properties. However, the physical process also has several drawbacks. The process requires significant equipment, usually including a large air compressor, hoses, and nozzle assembly. It is often difficult to contain and thoroughly clean up the abrasive material used. The process can be lengthy and physically difficult. It is often noisy, dusty, and uncomfortable when sandblasting or shot blasting. Lastly, physical abrasion requires experience to provide a consistent and even physical wearing, as well as the proper degree of roughening.

Alternatively, the concrete surface may be chemically roughened, in a process called etching. Etching dissolves acid-sensitive calcareous components of concrete from the surface through an acid reaction. The most common acid sensitive components in concrete include calcium carbonate, calcium oxide, and calcium hydroxide. The calcareous components interact with acidic components to form water, carbon dioxide, and calcium salts. The calcium salts will usually be somewhat soluble in the water present in the acid solution used. The dissolving of calcareous components roughens the concrete surface.

Generally, muriatic acid (hydrogen chloride) has been used to etch concrete surfaces. As a strong acid, it generally etches the concrete surface rapidly. Though muriatic acid is effective at etching, there are several associated drawbacks with its use. Muriatic acid is highly corrosive to other surfaces, especially metal, because it is such a strong acid. It causes almost instant staining or rust of such surfaces. Muriatic acid is also highly corrosive to eyes and skin, is toxic, and causes burning of mucous membranes. Additionally, the salts formed from the reaction can be very damaging to concrete if they are not removed from the surface.

SUMMARY

Therefore, a need exists for a single composition that safely and effectively cleans and prepares a concrete surface for finishing, and does so without causing harm to metals or other surfaces near or connected with the concrete surface, and without causing an obnoxious and harmful environment.

In one aspect, the present invention features a concrete cleaning and preparation composition, including urea hydrochloride, surfactant, water, and one or more glycol ethers.

In another aspect, the present invention features a method of preparing a concrete surface, which includes pre-wetting a concrete surface, applying a cleaning and preparation composition, including urea hydrochloride, surfactant, water, and one or more glycol ethers, and rinsing the concrete surface.

In another aspect, the present invention features a kit for cleaning, preparing, and coating concrete, including a cleaning and preparation composition which includes urea hydrochloride, and a coating.

The details of one or more embodiments of the invention are set forth in the accompanying drawings and the description below. Other features, objects, and advantages of the invention will be apparent from the description and drawings, and from the claims.

DETAILED DESCRIPTION

Adequate preparation of a concrete surface before application of a coating treatment enables better performance of the coating treatment and helps provide a long-lasting, good appearance. Even if the concrete surface is new or very clean, the surface is usually not adequately prepared for coating. A concrete surface is usually very hard and smooth, and lacks the roughness necessary for good adhesion of a finishing treatment. Concrete may be prepared for coating by physical or chemical processes. Examples of physical preparations include shot blasting or sandblasting the concrete surface. As discussed above, these physical processes can be dangerous, difficult, and slow. Therefore, chemical preparation of the concrete surface is preferred.

All percentages used throughout are weight %.

In one aspect, the invention features a concrete cleaning and preparation composition. The composition includes various components to clean and prepare the concrete surface. The cleaning and preparation composition is a one-step cleaner that cleans and removes a wide variety of stains, spills, dirt, grease, oils, and other contaminants from the concrete surface. Additionally, cleaning and preparation composition prepares the concrete surface so that a coating will adhere better to the surface. The cleaning and preparation composition is formulated so that it can be used by a do-it-yourselfer safely and easily, with no training and by following minimal instructions.

The cleaning and preparation composition includes water, urea hydrochloride, a surfactant, and glycol ether. The concrete cleaning and preparation composition may be made concentrated for later dilution before use, or may be in a ready to use state. Thus, the composition may be a gel, may be a viscous liquid, or may have a viscosity close to water. The concrete cleaner and preparation composition may be diluted by the user before use, so the composition may be available in a wide range of concentrations. Each concentration will require a corresponding appropriate amount of dilution prior to using the cleaning and preparation composition. Even a composition with a ready to use designation may be diluted before use in normal cleaning and preparation, but may be used directly without dilution if desired depending on the state of the concrete surface and the degree of etch required.

One component of the cleaning and preparation composition is water. Using an aqueous composition makes preparation and cleanup easier. For preparation, the area to be treated can be pre-prepared with water or other aqueous solution. This wets the area to be cleaned and enables the cleaning and preparation composition to have better dispersion across the surface and better contact with the surface to be cleaned. For cleanup, the area can be rinsed and cleaned after treatment by cleaning, spraying or splashing with water. Therefore, organic solvents or cleaners, with the associated fumes, expense, and other problems, are not necessary.

Another component of the cleaning and preparation composition is urea hydrochloride. Urea Hydrochloride is an organic acid salt compound that may be prepared by reacting urea with hydrogen chloride. This compound provides many of the desirable cleaning properties of hydrogen chloride. However, by inhibiting the hydrogen chloride with urea, the compound is less reactive, far less corrosive, and fumes far less than hydrogen chloride. The acidic urea hydrochloride reacts with the calcareous compounds in the concrete, though less vigorously than hydrogen chloride. This reaction process forms water, carbon dioxide, and calcium salts. This reaction will be fairly evident, as the reaction is quite effervescent due to the carbon dioxide formed by the reaction. The organic salts reaction product is more easily lifted out of the concrete pores than inorganic salts. The reaction products may be lifted especially well when the composition contains other components to act in conjunction with the organic portion of the salt to further lift the reaction product out of the concrete pores.

Another component of the cleaning and preparation composition is a surfactant. Surfactants act to improve the wetting ability of the composition by decreasing the surface tension. This enables the composition to spread more evenly and also enables better dispersion of the other components throughout the composition. The surfactant also helps in lifting reaction products from the concrete, exposing more reaction sites, and also removing unwanted and harmful salts from the concrete. Suitable surfactants include non-ionic, anionic, cationic, and amphoteric surfactants. Preferably, the surfactant will be a non-ionic surfactant. Suitable non-ionic surfactants include alcohol ethoxylates, blended alcohol ethoxylates, and alkyl phenol ethoxylates. Preferably, a linear alcohol ethoxylate blend will be used as the surfactant. An example of a blended alcohol ethoxylate is Videt Q3 (available from Vitech International Inc). Other surfactants include Bio-Soft (available from Stepan), Triton X100, Triton X110, and Triton X114 (available from Dow Chemical), Tergitol NP4, Tergitol NP8, Tergitol NP9 (available from Dow Chemical), the Neodol series (available from Shell Chemical), the Tomadol series (available from Tomah Products), and T-Det (available from Harcross).

Another component of the cleaning and preparation composition is glycol ethers. As glycol ethers are miscible with water, they can be used in aqueous compositions and still retain their solvent properties. Therefore, glycol ethers, which dissolve a wide range of substances, are ideal for use in the concrete cleaning and preparation composition. Suitable glycol ethers include ethylene glycol monoethyl ether, ethylene glycol monobutyl ether, propylene glycol monomethyl ether, propylene glycol n-propyl ether ("PNP"), dipropylene glycol n-propyl ether ("DPNP"), dipropylene glycol methyl ether ("DPM"), and propylene glycol n-butyl ether ("PNB"). Glycol ethers, depending upon their molecular structure, can have a greater or lesser hydrophilicity. Different glycol ethers will have different solubilities in water, and differing abilities to act as a solvent for organic materials. For this reason, preferably a mixture of glycol ethers will be used, one of which is more hydrophilic than the other. Any ratio of two or more glycol ethers may be used. The ratio should be selected so as to optimize the properties of the glycol ethers in an aqueous system. Preferably, the ratio will not exceed 10:1 between any two of the glycol ethers used. Also preferred are ratios that do not exceed 5:1, 4:1, 3:1, 2:1, or 1.5:1. Preferably, a mixture of DPM and PNB will be used. These glycol ethers have different solubilities, as DPM has greater hydrophilicity, while PNB has greater hydrophobicity. When used together, DPM and PNB will preferably be used in a ratio of between 1.5:1 and 3:1. More preferably, a ratio between about 1.8:1 to about 2.2:1 will be used when using DPM and PNB.

Optionally, other additives may be included in the cleaning and preparation composition. Optional additives include corrosion inhibitors, colorants, terpene hydrocarbons, petroleum distillates, di-basic esters, alcohols, and fragrances.

Optionally, corrosion inhibitors may be added as a protection for surfaces other than the concrete surface being cleaned and prepared. The other components of the composition may cause discoloration, staining or slight corrosion of non-concrete surfaces with which the composition may come into contact. Metals are particularly susceptible in this area, and are also fairly common near concrete surfaces such as a garage floor. Therefore, it may be desirable to add a corrosion inhibitor to the composition in order to prevent or greatly reduce staining or corrosion. Various types of inhibitors, such as acid-inhibitors, or ion-inhibitors, may be used. Corrosion inhibitors generally function by forming an extremely thin protective coating on objects, such as metals, with which the inhibitor-containing composition may come into contact. This extremely thin layer prevents the other components of the composition from adversely affecting the object. Thus, the inhibitor is able to prevent or nearly eliminate staining, corrosion, and even discoloration. Inhibitors may be susceptible to light or oxidation, so the inhibitor, or a composition including an inhibitor, should be kept in an opaque or colored, sealed container. Suitable corrosion inhibitors include ViHib MSI (available from Vitech International Inc), Protectosil CIT (available from Degussa Corp.), and Armohib 28 and Armohib 31 (available from Akzo Nobel).

Optionally, one or more colorants may also be added to the concrete cleaning and preparation composition. Colorants may be added to improve the aesthetic appearance of the composition. Additionally, a colorant will enable the user to distinguish between the aqueous concrete cleaning and preparation composition and water, even when the composition has been diluted. Preferably, the colorant added will be one or more organic dyes. If pigments, or water soluble inks are selected, the colorant may penetrate the concrete which is likely to cause staining or discoloration of the concrete surface. Suitable colorants will be readily dispersible in an acidic aqueous composition, so that the colorants remain dispersed and do not fall out of the composition. Suitable dyes include the LX dye series (available from Pylam Products Company, Inc.) and Liquitint dyes (available from Milliken Chemical). Examples of suitable Pylam dyes include acid blue LX-9738 and acid pink LX-10585.

Optionally, terpene hydrocarbons, such as pine oil or d'limonene, may be added to the cleaning and preparation composition. These terpene hydrocarbons act as additional cleaning agents and may be able to reduce or clear some types of stains or spills more effectively than other additives. Optionally, one or more terpene hydrocarbons may be present.

Optionally, one or more di-basic esters may be added to the cleaning and preparation composition. These di-basic esters act as weak acids and are particularly effective at stripping paint and removing grease. Suitable di-basic esters include DBE (available from DuPont Chemicals), and Dibasic ester (available from Barton Solvents).

Optionally, one or more alcohols may be added to the cleaning and preparation composition. Alcohols can solubilize some types of oils, and may clean some types of spills from the concrete surface more effectively than other additives. Examples of suitable alcohols include methyl alcohol, ethyl alcohol, isopropyl alcohol, benzyl alcohol, etc. These are generally available from chemical suppliers including J T Baker, and GFS Chemicals.

Optionally, one or more fragrances may be added to the cleaning and preparation composition. Adding a fragrance may make the product more pleasant for the user during application, treatment, and cleanup. A fragrance may also serve to alert others to the presence of the composition and assist in warning when a container is open. Suitable fragrances will be soluble or readily dispersible in an acidic aqueous composition. Suitable fragrances include the S3 series of fragrances (available from Premier Specialty, Inc.), fragrances (available from Flavor & Fragrance Specialties), and fragrances (available from Technology Flavors & Fragrances, Inc.). Examples of suitable fragrances from Premier Specialty include Premier S3-20752 Gardenia, and Premier S3-20750 Cherry. Optionally, one or more fragrances may be present.

Optionally, one or more petroleum distillates may be added to the concrete cleaning and preparation composition. Petroleum distillates can be effective in cleaning oils, greases, and other organic materials. Petroleum distallates are available from numerous suppliers, including Haltermann Products and Shell Chemicals. Optionally, one or more petroleum distillates may be present.

The concrete cleaner and preparation composition may be supplied in a concentrated form or in a variety of diluted forms. Therefore, the concentration of the components in the supplied composition may vary widely. Depending upon the application and the concentration of the composition supplied, the user may dilute the composition prior to use. The final concentration may be reached from a wide range of supplied concentrations, using water to dilute the supplied composition to the final concentration, by using an appropriate dilution factor. Therefore, the composition may be provided in a variety of concentrated forms which may require dilution by the user. For example, the composition may be diluted 1:1, 1.5:1, 2:1, 3:1, or by using many other dilution ratios. Although the components may be present in a wide concentration range prior to use, it is the concentration at the time of use, the effective cleaning composition, that is important.

One manner of characterizing the composition is to describe the percentages of the various components that may be present in the composition, as used and applied to the concrete surface in order to clean and prepare the surface. As described above, these percentages may be achieved by pre-dilution from various concentrations.

As part of an effective cleaning composition, the urea hydrochloride concentration level may suitably be more than about 4%, preferably from about 4% to about 20%, more preferably from about 5% to about 15%, even more preferably from about 6% to about 12%, or most preferably from about 8% to about 10%.

As part of an effective cleaning composition, the surfactant concentration level may suitably be more than about 0.01%, preferably from about 0.01% to about 4%, more preferably from about 0.02% to about 1%, even more preferably from about 0.05% to about 0.5%, or most preferably from about 0.1% to about 0.3%.

As part of an effective cleaning composition, one or more glycol ethers may suitably be present at a concentration level more than about 0.01%, preferably from about 0.01% to about 5%, more preferably from about 0.1% to about 4%, even more preferably from about 0.5% to about 3%, or most preferably from about 1.5% to about 2.5% in the final composition.

Optionally, as part of an effective cleaning composition, one or more corrosion inhibitors may suitably be present at a concentration level more than about 0.01%, preferably from about 0.01% to about 2%, more preferably from about 0.02% to about 1%, even more preferably from about 0.05% to about 0.75%, or most preferably from about 0.1% to about 0.5%.

Optionally, as part of an effective cleaning composition, one or more colorants may suitably be present at a concentration level more than about 0.000001%, preferably from about 0.00001% to about 0.005%, or more preferably from about 0.00005% to about 0.001%.

Optionally, as part of an effective cleaning composition, one or more fragrances may suitably be present at a concentration level more than about 0.00001%, preferably from about 0.0001% to about 0.4%, or more preferably from about 0.001% to about 0.2%.

Optionally, as part of an effective cleaning composition, one or more terpene hydrocarbons may be present at a concentration more than 0.1%, preferably from about 0.5% to about 5%, or more preferably from about 1% to about 4%.

Optionally, as part of an effective cleaning composition, one or more di-basic esters may suitably be present at a concentration from about 0.1% to about 10%, preferably from about 0.5% to about 5%, or more preferably from about 1% to about 4%.

Optionally, as part of an effective cleaning composition, one or more alcohols may suitably be present at a concentration level from about 0.1% to about 10%, preferably from about 1% to about 9%, or more preferably from about 2% to about 7%.

Optionally, as part of an effective cleaning composition, one or more petroleum distillates may suitably be present at a concentration up to about 5%, preferably from about 0.1% to about 3%, or more preferably from about 0.5% to about 2%.

Another manner of characterizing the composition is by using a ratio between the various non-aqueous components. One preferred ratio is based on the amount of surfactant present.

The urea hydrochloride to surfactant ratio may suitably be greater than about 10:1, preferably greater than about 15:1, more preferably greater than 20:1, even more preferably greater than about 25:1, and most preferably greater than about 30:1. The urea hydrochloride to surfactant ratio may preferably be less than about 200:1, more preferably less than about 100:1, and even more preferably less than about 50:1.

The one or more glycol ethers to surfactant ratio may suitably be greater than about 1:1, preferably greater than about 3:1, more preferably greater than about 5:1, even more preferably greater than about 7:1, and most preferably greater than about 8:1. The one or more glycol ethers to surfactant ratio may preferably be less than about 100:1, more preferably less than about 50:1, even more preferably less than about 25:1, and most preferably less than about 12:1.

Optionally, if present, the corrosion inhibitors to surfactant ratio may suitably be greater than about 0.01:1, preferably greater than about 0.1:1, more preferably greater than about 0.3:1, even more preferably greater than about 0.5:1, or most preferably greater than about 1:1. Optionally, if present, the corrosion inhibitors to surfactant ratio may preferably be less than about 20:1, more preferably less than about 10:1, even more preferably less than about 5:1, and most preferably less than about 3:1.

Another aspect of the present invention is a method of cleaning and preparing a concrete surface. Suitable and typical concrete surfaces for this method include indoor concrete floors, concrete garage floors, concrete patios, sidewalks, concrete driveways, and concrete walls. The method includes the steps of pre-wetting a concrete surface, applying a cleaning and preparation composition to the surface, and rinsing the concrete surface.

First, the surface should preferably be pre-wetted. Pre-wetting the surface helps the cleaning solution stay at the surface and prevents deep penetration into the concrete where the composition and reaction products may be very difficult to remove. Further, pre-wetting provides a wet surface that promotes the dispersion of the cleaning and preparation composition, and also provides a liquid surface to help the cleaning and preparation process. The additional liquid helps carry away surface dirt and grime, greases and oils that have been lifted up by components of the composition, and helps carry away and dilute reaction products. Preferably, an aqueous solution will be used as the pre-wetting agent. Also preferred is pre-wetting with water itself.

The concrete cleaning and preparation composition should be prepared prior to application. The composition may be in concentrated liquid or gel form and require proper dilution before application, or it may be in an already diluted, ready to use concentration. As water is a significant component, it may be more economical and practical to add a majority of the necessary water just before use. Therefore, if necessary, the user may add the proper amount of water, diluting the composition to prepare the cleaning and preparation composition for use.

After completing any readying steps, the prepared cleaning and preparation composition is applied to the concrete surface. Preferably, the concrete surface should be damp, but not too wet, and excess liquid should be removed prior to application of the cleaning and preparation composition. The cleaning and preparation composition may be applied by spraying, by spreading with a brush, roller, or broom, or may be poured over the surface and spread using a trowel, brush, broom, or other article. Proper safety equipment should be used, and care should be taken so that the cleaning and preparation composition does not spread or travel beyond the desired area. The composition should be left on the concrete surface until the surface has been adequately cleaned and prepared. Extra attention might be required in some areas of heavier staining or soiling. A brush, broom, or other article may be used to apply physical cleaning action to certain areas as well as the chemical cleaning action of the composition. The concrete etching will be evident as the liquid will effervesce due to the released carbon dioxide. Attention should be paid to ensure that all areas of the surface are effervescing, and that the concrete is being suitably prepared in all areas. Typically, proper preparation will require from one to five minutes, depending upon how dirty the concrete surface appears, the type of concrete used, and whether concrete sealants were used. For best results, the concrete cleaning and preparation composition should not be allowed to dry on the surface. If drying starts to occur, the surface should preferably be re-wet using additional cleaning and preparation composition and/or water.

After the concrete surface has been suitably cleaned and prepared, the concrete surface should preferably be rinsed. The rinsing washes the cleaning and preparation composition, reaction products, and cleaned dirt, oils, etc. from the surface. Preferably, an aqueous solution will be used for rinsing, and typically, water will be used. The concrete surface may be rinsed by spraying the surface using a hose, spray nozzle, high pressure spray, or other dispenser of water, by using a mop, squeegee, or other implement, or by rubbing the surface using wet towels or other item. Preferably, the concrete surface will be rinsed using a large excess of water or other liquid, and this will typically involve using a hose when cleaning and preparing a garage floor. Care should be taken to minimize splashing of the cleaning and preparation composition, and to also minimize the contact of the cleaning and preparation composition with other surfaces. Using a large amount of excess liquid will dilute the cleaning and preparation composition, end the cleaning and preparation process, and protect other surfaces through dilution of the components of the composition. Rinsing will also wash away the dirt, grime, greases, oils, reaction products, and other undesirable compounds and materials. After rinsing, excess liquid may be removed by sweeping, squeegeing, or other methods. Depending on the coating selected, further drying of the concrete surface may be desirable, and may involve fans, wet/dry vacuums, heat, or the passage of time. Preferably, the surface will be dry to the touch prior to coating.

The concrete surface is ready for coating after it has been thoroughly cleaned and prepared. A treatment to beautify and protect the concrete surface may be applied. The coating may be clear, tinted, or opaque. A number of coatings may be used, including solvent-based acrylic paints and varnishes, oil-based paints, concrete stains, water-based and solvent-based polymer coatings, epoxy coatings, urethanes, latex garage paints, silanes, siloxanes, clear sealers, silicone-modified floor paints, aliphatic polyureas, etc. Preferably a polymer coating, a urethane, or an epoxy coating will be used. More preferably, a water based epoxy coating will be used. A water-based epoxy will have low flammability, low volatile organic compounds ("VOCs"), and may be easier to use than solvent-based coatings. Preferred epoxy polymer systems include two component, water-based epoxies. These may be tinted or clear. A tinted water-based epoxy system typically contains at least 30% solids, 20% PVC and has low VOCs. Preferably, an epoxy system used will contain at least 40% solids, at least 25% PVC, and VOCs will be present at a concentration less than 100 grams/liter.

In order to provide enhanced protection, more than one layer of coating may be applied. If more than one layer is used, the first layer should preferably be allowed to dry sufficiently before an additional layer is applied. Allowing the coating to dry overnight, or at least 12 hours, would generally be sufficient drying. The additional layer may be the same as the prior layer, or may be different. Suitable coatings used for a additional layers, include the coatings mentioned above, as well as penetrating clear sealers, clear acrylic sealers, latex garage paints, acrylic stains, water and solvent based paints, polyurethanes, aliphatic polyureas, epoxies, and silicone-modified polymer systems.

Optionally, the coating may have a texture. The texture may be included in the coating, or be supplied as a material that can be shaken onto or spread over the top of the coating after application. The texture may be applied with, or after, any layer.

Optionally, colorants may be provided enabling the user to select and mix a desired intensity or shade of the coating. Additionally, colored flecks may be provided which may be mixed in the coating, or which may be shaken or spread over the top of the coating after application.

Optionally, there may be a surface treatment applied after all coating layers. This treatment would be less permanent than the coating layers, but would provide additional shine or gloss. Suitable final surface treatments include waxes, polishes, and floor finishes.

Another aspect of the present invention is a kit that includes a concrete cleaning and preparation composition and a coating. This kit allows the user to have the necessary items in one package. The kit acts as a reminder to the user that the concrete surface should be prepared before coating. Additionally, by combining the cleaning and preparation composition with an appropriate coating, the user saves the time otherwise required to locate and select the items separately. Optionally, instructional media or tips, illustrations or drawings, personal protective equipment, and measuring tools and dispensers, application devices, colorants, additional color chips, or other items may be included in the kit.

Optionally, the kit may include colorants or color chips for use with the coating. In addition to a clear, tinted, or colored coating, the kit may include one or more colorants, such as tint or dye, to be mixed into the coating so that user may vary the intensity or shade of the color. Additionally, color chips may be included that can be spread onto or across the coating after it is applied to give a different visual effect to the finished project. Optionally, there may also be a shaker or spreader for use with colorants or color chips.

Optionally, the kit may include an application device for the cleaning and preparation composition or for the coating. This may be a brush, roller, or other item. This further enables one-stop purchasing, and easily resolves questions a user may have about what type of applicator should be used. Optionally, the kit may include personal protective equipment. This might include gloves, safety glasses, or other items. Instructions and recommendations for use may also be included. Optionally, measuring tools and dispensers may be included. This may include measuring cups, spoons, nozzles, bucket, or other item.

EXAMPLES

Concrete cleaning and preparation compositions may be prepared as shown in Table 1. The composition may be prepared in a concentrated form, as shown in Column 1, "Concentrated." The concentrated composition may be prepared for use by diluting it by adding 3 parts water for every 1 part composition. A semi-concentrated, more ready to use concrete cleaning and preparation composition may be prepared as shown in Column 2, "Semi-Concentrated." The semi-concentrated composition may be prepared for use by dilution, using 1 part water for every 1 part composition. Alternatively, it may be used as is, depending on the degree of cleaning and etch desired or required. A fully ready to use concrete cleaning and preparation composition may be prepared as shown in Column 3, "Ready-to-Use." This composition is ready for use, and is not recommended for further dilution. Another fully ready to use composition may be prepared as shown in column 4, "RTU Green." This composition has both a colorant (Acid green LX-7342B) and a fragrance (Premier S3-20751 Green Apple).

TABLE 1

Concrete Cleaning and Preparation Compositions

| Component % | 1 Concentrated | 2 Semi-Concentrated | 3 Ready-to-Use | 4 RTU Green |
|---|---|---|---|---|
| Water | 57.7 | 76.1 | 88.86 | 88.86 |
| Urea Hydrochloride | 33 | 18 | 8.5 | 8.5 |
| Surfactant (Videt Q3) | 0.9 | 0.5 | 0.24 | 0.24 |
| Inhibitor (ViHib MSI) | 0.9 | 0.9 | 0.3 | 0.3 |
| Glycol ether (DPM) | 5 | 3 | 1.4 | 1.4 |
| Glycol ether (PnB) | 2.5 | 1.5 | 0.7 | 0.7 |
| Colorant | | | | 0.00001 |
| Fragrance | | | | 0.0025 |

An example of a kit containing a concrete cleaning and preparation composition includes:

A one gallon can, filled ¾ full, containing "part A"—an amine component, tinted light gray;

A one quart can, filled completely full, containing "part B"—an epoxy component to be mixed in with part A before application;

A one quart of concentrated cleaner, prepared according to Table 1, column 1, to be diluted with 3 parts water to make one gallon of solution.

Instructional paperwork;

A plastic bag filled with a color fleck assortment (Mixture of black, gray, and white colored flecks);

A fleck dispenser; and

Safety glasses.

The above kit is merely one example, and other examples of kits may contain variations, additions, or subtractions compared with the above example. For example, different tinting in "part A", a separate container of tint, different fleck assortment, different concrete cleaning and preparation composition concentration, instructional media on a VCR tape, DVD, or CD-ROMs, can openers, stir sticks, scrapers, cloths, and additional personal protective equipment, or other items may be included in the kit without departing from the spirit of the invention.

The effectiveness of the concrete cleaning and preparation solution may be tested through the evaluation of concrete test squares, which have been cleaned and prepared, and then coated. Concrete test squares are small squares of concrete, which may measure, for example, 8 inches×8 inches×2 inches. Test squares are available from a number of suppliers, for example, Americast Concrete in Ashland, Va., and Construction Test Laboratories in Skokie, Ill. ("CTL"). Two types of concrete test squares were used and compared in order to evaluate product performance in commonly encountered concrete surface alternatives. One type is "hard troweled" concrete, in which the concrete is poured into the form, and then a trowel used to make the surface smooth and even, finishing the surface. The second type is "cured and sealed" concrete, in which the same approach is taken as for "hard troweled", with the addition that a concrete sealing and curing agent was applied to the concrete after troweling. A variety of concrete sealing and curing agents are available. The one used for all the test concrete squares described below was Sonneborn's Kure N Seal, available from Degussa Building Systems (Shakopee, Minn.).

In order to determine the effectiveness of the cleaning and preparation compositions, test squares were cleaned and prepared using a variety of compositions. Then the test squares were coated with a paint or sealant. In order to investigate the effectiveness when used with a variety of finishes, a number of different paints and sealants were tested.

Five different cleaning and preparation compositions were used. A description of each and the abbreviation used in the reporting tables are:
1) H2O water only
2) CA 8% citric acid in water solution (powdered citric acid available from Alfa Aesar, or other chemical suppliers)
3) DW Valspar Driveway Cleaner (available from Valspar Products, Minneapolis, Minn.)
4) C&P Concrete cleaning and preparation composition (same as that shown in Table 1, column 2 above)
5) HCl 9% hydrochloric acid solution (concentrated hydrochloric acid available from Fisher Scientific and other chemical suppliers)

A number of different coatings on prepared concrete test squares were used to test the effectiveness of the coating in combination with the various cleaning and preparation compositions. Each test square was coated with two coats of the product described, with a waiting period of 24 hours between coatings. The coatings tested included:
A) Solvent-based Epoxy. Valspar 380 VOC Garage Floor Epoxy (available from Valspar Products Inc., Minneapolis, Minn.)
B) Water-based Epoxy. Rustoleum Epoxy Shield (available from Rustoleum Brands, Vernon Hills, Ill.)
C) Solvent-based Acrylic Latex. H&C Concrete Sealer (available from Sherwin Williams, Cleveland, Ohio)
D) Water-based Acrylic Latex. Behr Latex Garage (available from Behr Process Corp., Santa Ana, Calif.)

The concrete squares were all prepared in a similar manner. First, the concrete square was sprayed with water. Next, the designated cleaning composition was sprayed using a manual trigger spraying unit onto the concrete squares. After approximately three minutes, including intermittent agitation with an acid brush, the concrete square was rinsed. The concrete square was rinsed by spraying with water, using a hose and a spray nozzle. The cleaned and prepared concrete test squares were then allowed to dry overnight.

After drying, each designated coating was rolled onto the surface of the matching concrete square using a paint roller (⅜ inch nap). After waiting 24 hours, a second identical coating was applied, again using a paint roller. The test concrete squares were then allowed to cure for at least three days at room temperature (from about 15° C. to about 25° C.).

The concrete squares were then tested. Testing included adhesion testing, hot tire resistance, and chemical resistance testing.

Adhesion of the coating to the concrete surface was tested by using a PATTI adhesion testing device. The test was performed according to ASTM D4541-95e1 "Standard Test Method for Pull-Off Strength of Coatings Using Portable Adhesion Testers." A PATTI adhesion testing machine, such as the PATTI 110 Pneumatic Adhesion Tester, is available from Elcometer Inc., Detroit, Mich. The PATTI adhesion test machine applies an increasing, known amount of pneumatic force during each test. In this way, an accurate and repeatable adhesion value, with a margin of error of +/−2%, can be obtained for each coating to be tested.

The steps of the test can generally be described as follows. An aluminum pull stub was adhered to the surface of the coating with an epoxy adhesive and allowed to cure. After 24 hours, a piston was attached to the affixed pull stub, and the piston held in place by threading a plate with an internal gasket over the piston. Air pressure was then applied throughout the unit, causing the gasket to swell, moving the piston away from the surface of the coating. This movement and pressure eventually caused a failure on the surface and release of the stub. As the epoxy adhesive strongly holds the coating to the pull tab, it was usually the coating that pulled from the concrete surface, sometimes with part of the concrete, rather than the pull stub pulling free of the coating. As the air pressure at the time of failure was known, a measure of adhesion of the coating was recorded. The pressure value was converted into a psi adhesion value for that coating, which is reported on the tables. The greater the pressure required to pull the piston from the surface of the substrate before failure, the better the adhesion value for that coating.

TABLE 3

PATTI Adhesion Test Results

| Concrete Surface pre-prep | Treatment | Valspar 380 VOC Gray Solvent Epoxy Garage Floor Paint in Special White Base 1B82101/1V81018 | | Rustoleum Epoxy Shield Silver Gray 2K Solventborne Industrial Floor Coating 203373 | |
|---|---|---|---|---|---|
| | | tensile strength (psi) | mode of failure | tensile strength | mode of failure |
| Cured and Sealed Concrete | H2O | <400 | concrete (before pull) | 697 | concrete & coating |
| | CA | <400 | concrete & coating | <400 | concrete & coating |
| | DW | <400 | concrete & coating | <400 | concrete & coating |
| | C&P | <400 | coating | 1154 | concrete |
| | HCl | 631 | concrete & coating | 1178 | concrete & coating |
| Hard Troweled Concrete | H2O | 737 | concrete | 876 | concrete |
| | CA | 615 | concrete | 766 | concrete |
| | DW | 635 | concrete | 1015 | concrete |
| | C&P | 897 | concrete | 839 | concrete |
| | HCl | 737 | concrete | 484 | concrete |

| Concrete Surface pre-prep | Treatment | Behr Plus 10 Si Acrylic Latex Concrete Floor Stain Pebble Gray in 800 White Base | | H&C Si Acrylic 10.00014 Gray in White Base | |
|---|---|---|---|---|---|
| | | tensile strength (psi) | mode of failure | tensile strength | mode of failure |
| Cured and Sealed Concrete | H2O | 452 | concrete | 684 | concrete |
| | CA | 762 | concrete & coating | 705 | coating |
| | DW | 472 | concrete | 754 | concrete & coating |
| | C&P | 562 | coating | 697 | coating |
| | HCl | 541 | concrete | 419 | concrete |
| Hard Troweled Concrete | H2O | 778 | concrete | 811 | concrete |
| | CA | 656 | concrete & coating | 1023 | concrete |
| | DW | 701 | concrete & coating | 917 | concrete |
| | C&P | 831 | concrete & coating | 864 | concrete |
| | HCl | 778 | concrete | 1015 | concrete |

Hot tire resistance is another measure of coating performance. The hot tire resistance test was performed according to the method described below, and does not correspond to an ASTM test number. To begin the test, a puddle of water about the size of a tire piece or slightly larger, was placed on the coated panel. The water puddle was covered with a watch glass or other covering to prevent or minimize evaporation. After 4 hours, the covering was removed, and a tire piece was placed on the wet puddle on the coated concrete sample. The coated concrete sample, puddle, and tire was placed in a 140° F. oven, with the tire piece being pressed down with 40 psi pressure. After four hours, the pressure was released and the coated concrete sample and tire were removed from the oven. The tire piece was twisted and pulled from the panel in one motion. Any delamination of the coating from the concrete indicated failure. Furthermore, the coating was also inspected for small bubbles, tears, or creases to determine if minor failure was beginning to occur.

TABLE 4

Hot Tire Adhesion Test Results

| Concrete Surface pre-prep | Treatment | Valspar 380 VOC Gray Solvent Epoxy Garage Floor Paint in Special White Base 1B82101/1V81018 | | Rustoleum Epoxy Shield Silver Gray 2K Solventborne Industrial Floor Coating 203373 | |
|---|---|---|---|---|---|
| | | result | comment | result | comment |
| Cured and Sealed Concrete | H2O | pass | moderate tire mark | pass | moderate tire mark |
| | CA | pass | light tire mark | pass | severe tire mark |
| | DW | fail | | pass | indentation lt mark |
| | C&P | pass | severe tire mark | pass | light tire mark |
| | HCl | pass | severe tire mark | fail | |
| Hard Troweled Concrete | H2O | pass | severe tire mark | pass | severe tire mark |
| | CA | pass | light tire mark | pass | light tire mark |
| | DW | pass | moderate tire mark | pass | light tire mark |
| | C&P | pass | moderate tire mark | pass | light tire mark |
| | HCl | pass | severe tire mark | pass | severe tire mark |

| Concrete Surface pre-prep | Treatment | Behr Plus 10 Si Acrylic Latex Concrete Floor Stain Pebble Gray in 800 White Base | | H&C Si Acrylic 10.00014 Gray in White Base | |
|---|---|---|---|---|---|
| | | result | comment | result | comment |
| Cured and Sealed Concrete | H2O | pass | | pass | light tire mark |
| | CA | pass | light tire mark | pass | light tire mark |
| | DW | pass | severe tire mark | pass | light tire mark |
| | C&P | fail | | pass | moderate tire mark |
| | HCl | fail | | pass | moderate tire mark |
| Hard Troweled Concrete | H2O | pass | severe tire mark | pass | light tire mark |
| | CA | pass | severe tire mark | pass | light tire mark |
| | DW | pass | severe tire mark | pass | moderate tire mark |
| | C&P | fail | | pass | moderate tire mark |
| | HCl | fail | | pass | light tire mark |

Coating performance was also measured by a coating chemical resistance test panel. The test was performed according to ASTM D1308-87(1998) "Standard Test Method for Effect of Household Chemicals on Clear and Pigmented Organic Finishes." Although different coatings respond differently to various chemicals, the overall performance of the coating may still be determined. Tables 5A-5D present individual test results, as well as overall scores including a summary score and an excellence rating. In addition, different cleaning compositions have been used on test squares having the same coating. Therefore, the variation in performance of the coating on squares prepared using different cleaning compositions was measured. These measures enable an evaluation of the cleaning composition used.

The chemical resistance test was conducted by placing an amount of the material to be tested on the coated concrete test square. The material was then covered with a watch glass, and allowed to rest at ambient temperature. After one hour, the watch glass and material was removed and the surface inspected for any visual defects. The scoring system used was:

1=film lifted;
2=film softening;
3=slight film softening;
4=color change;
5=gloss change;
6=no effect.

An overall score for each coating and cleaning composition combination. The overall score is the sum of each individual chemical scores for that particular combination. Additionally, an excellence rating, equal to the number of chemicals which had no effect on the coating, was determined for each combination.

TABLE 5A

Chemical Test Results

| FORMULA>>> | Valspar 380 VOC Gray Solvent Epoxy Garage Floor Paint in Special White Base 1B82101/1V81018 | | | | | | | | | |
|---|---|---|---|---|---|---|---|---|---|---|
| SURFACE PREPARATION>>> | CURED AND SEALED | | | | | HARD TROWELED | | | | |
| CONCRETE PRETREATMENT>>> | H2O | CA | DW | C&P | HCl | H2O | CA | DW | C&P | HCl |
| water | 6 | 6 | 6 | 6 | 6 | 6 | 6 | 6 | 6 | 6 |
| Scott's Halts Plus 30-3-4 | 4 | 4 | 4 | 4 | 4 | 4 | 4 | 4 | 4 | 4 |
| 409 Cleaner | 5 | 5 | 4 | 6 | 6 | 5 | 5 | 4 | 6 | 5 |
| used oil/gas mix | 6 | 6 | 6 | 6 | 4 | 6 | 6 | 6 | 6 | 6 |
| brake fluid | 3 | 4 | 4 | 4 | 4 | 4 | 4 | 4 | 4 | 4 |
| windshield wiper fluid | 4 | 4 | 4 | 4 | 4 | 4 | 4 | 4 | 4 | 4 |
| auto trans fluid | 6 | 6 | 6 | 6 | 6 | 6 | 6 | 6 | 5 | 6 |
| antifreeze | 6 | 6 | 6 | 6 | 6 | 6 | 6 | 6 | 6 | 6 |
| conc. cold NaCl | 6 | 6 | 6 | 6 | 6 | 5 | 6 | 6 | 6 | 6 |
| conc. cold CaCl2 | 6 | 6 | 6 | 6 | 6 | 5 | 6 | 6 | 6 | 6 |
| 10% sulfuric acid | 3 | 3 | 3 | 3 | 4 | 3 | 3 | 3 | 3 | 4 |

TABLE 5A-continued

Chemical Test Results

| FORMULA>>> | Valspar 380 VOC Gray Solvent Epoxy Garage Floor Paint in Special White Base 1B82101/1V81018 | | | | | | | | | |
|---|---|---|---|---|---|---|---|---|---|---|
| SURFACE PREPARATION>>> | CURED AND SEALED | | | | | HARD TROWELED | | | | |
| CONCRETE PRETREATMENT>>> | H2O | CA | DW | C&P | HCl | H2O | CA | DW | C&P | HCl |
| 10% sodium hydroxide | 3 | 3 | 3 | 5 | 5 | 3 | 6 | 6 | 5 | 6 |
| ethanol | 3 | 3 | 3 | 3 | 4 | 3 | 3 | 3 | 3 | 3 |
| mineral spirits | 3 | 6 | 6 | 6 | 6 | 6 | 6 | 6 | 6 | 4 |
| xylene | 2 | 2 | 2 | 3 | 4 | 2 | 3 | 3 | 4 | 3 |
| muriatic acid | 3 | 3 | 3 | 3 | 4 | 3 | 3 | 3 | 4 | 6 |
| overall score | 69 | 73 | 72 | 77 | 79 | 71 | 77 | 76 | 78 | 79 |
| excellence rating | 6 | 7 | 7 | 8 | 7 | 5 | 8 | 8 | 7 | 8 |

TABLE 5B

Chemical Test Results

| FORMULA>>> | Rustoleum Epoxy Shield Silver Gray 2K Solventborne Industrial Floor Coating 203373 | | | | | | | | | |
|---|---|---|---|---|---|---|---|---|---|---|
| SURFACE PREPARATION>>> | CURED AND SEALED | | | | | HARD TROWELED | | | | |
| CONCRETE PRETREATMENT>>> | H2O | CA | DW | C&P | HCl | H2O | CA | DW | C&P | HCl |
| water | 6 | 6 | 6 |  | 6 | 6 | 4 | 6 | 6 | 6 |
| Scott's Halts Plus 30-3-4 | 4 | 4 | 4 |  | 4 | 4 | 4 | 4 | 4 | 4 |
| 409 Cleaner | 6 | 5 | 5 |  | 6 | 5 | 4 | 4 | 5 | 4 |
| used oil/gas mix | 6 | 6 | 6 |  | 6 | 6 | 5 | 6 | 5 | 5 |
| brake fluid | 3 | 5 | 4 |  | 4 | 4 | 4 | 4 | 4 | 4 |
| windshield wiper fluid | 4 | 4 | 4 |  | 4 | 4 | 4 | 4 | 4 | 4 |
| auto trans fluid | 6 | 6 | 6 |  | 6 | 6 | 6 | 6 | 5 | 6 |
| antifreeze | 6 | 4 | 6 |  | 6 | 6 | 6 | 5 | 6 | 6 |
| conc. cold NaCl | 5 | 5 | 5 |  | 6 | 5 | 6 | 6 | 6 | 4 |
| conc. cold CaCl2 | 6 | 6 | 4 |  | 6 | 5 | 5 | 6 | 6 | 6 |
| 10% sulfuric acid | 4 | 4 | 4 |  | 4 | 4 | 4 | 4 | 3 | 4 |
| 10% sodium hydroxide | 3 | 6 | 6 |  | 4 | 3 | 6 | 6 | 5 | 6 |
| ethanol | 3 | 3 | 3 |  | 5 | 3 | 3 | 3 | 3 | 5 |
| mineral spirits | 3 | 3 | 6 |  | 5 | 6 | 6 | 5 | 6 | 5 |
| xylene | 3 | 3 | 3 |  | 5 | 4 | 3 | 5 | 4 | 4 |
| muriatic acid | 3 | 4 | 4 |  | 3 | 4 | 4 | 3 | 4 | 4 |
| overall score | 71 | 74 | 76 |  | 80 | 75 | 74 | 77 | 76 | 77 |
| excellence rating | 6 | 5 | 6 |  | 7 | 5 | 5 | 6 | 5 | 5 |

TABLE 5C

Chemical Test Results

| FORMULA>>> | Behr Plus 10 Si Acrylic Latex Concrete Stain Pebble Gray in White Base 800 | | | | | | | | | |
|---|---|---|---|---|---|---|---|---|---|---|
| SURFACE PREPARATION>>> | CURED AND SEALED | | | | | HARD TROWELED | | | | |
| CONCRETE PRETREATMENT>>> | H2O | CA | DW | C&P | HCl | H2O | CA | DW | C&P | HCl |
| water | 3 | 3 | 3 | 3 | 3 | 2 | 3 | 3 | 3 | 3 |
| Scott's Halts Plus 30-3-4 | 3 | 3 | 3 | 3 | 3 | 3 | 3 | 3 | 3 | 3 |
| 409 Cleaner | 3 | 2 | 2 | 2 | 2 | 3 | 2 | 2 | 2 | 2 |
| used oil/gas mix | 4 | 6 | 4 | 4 | 4 | 5 | 6 | 4 | 4 | 4 |
| brake fluid | 2 | 2 | 2 | 2 | 1 | 2 | 2 | 2 | 1 | 1 |
| windshield wiper fluid | 3 | 3 | 3 | 3 | 3 | 6 | 2 | 3 | 3 | 3 |
| auto trans fluid | 3 | 6 | 6 | 3 | 6 | 5 | 6 | 6 | 3 | 6 |
| antifreeze | 3 | 3 | 3 | 3 | 3 | 3 | 3 | 3 | 3 | 3 |
| conc. cold NaCl | 3 | 6 | 3 | 6 | 6 | 3 | 3 | 3 | 6 | 6 |
| conc. cold CaCl2 | 3 | 6 | 6 | 3 | 3 | 3 | 6 | 6 | 6 | 3 |
| 10% sulfuric acid | 3 | 3 | 3 | 3 | 3 | 3 | 3 | 3 | 6 | 3 |
| 10% sodium hydroxide | 3 | 3 | 3 | 3 | 3 | 3 | 3 | 3 | 3 | 3 |
| ethanol | 2 | 2 | 2 | 2 | 2 | 6 | 2 | 2 | 2 | 2 |
| mineral spirits | 3 | 6 | 3 | 6 | 3 | 6 | 6 | 3 | 6 | 6 |

TABLE 5C-continued

Chemical Test Results

| FORMULA>>> | Behr Plus 10 Si Acrylic Latex Concrete Stain Pebble Gray in White Base 800 | | | | | | | | | |
|---|---|---|---|---|---|---|---|---|---|---|
| SURFACE PREPARATION>>> | CURED AND SEALED | | | | | HARD TROWELED | | | | |
| CONCRETE PRETREATMENT>>> | H2O | CA | DW | C&P | HCl | H2O | CA | DW | C&P | HCl |
| xylene | 1 | 1 | 1 | 1 | 1 | 1 | 1 | 2 | 2 | 1 |
| muriatic acid | 3 | 3 | 3 | 3 | 3 | 3 | 3 | 3 | 3 | 3 |
| overall score | 45 | 58 | 50 | 50 | 49 | 57 | 54 | 51 | 56 | 52 |
| excellence rating | 0 | 5 | 2 | 2 | 2 | 3 | 4 | 2 | 4 | 3 |

TABLE 5D

Chemical Test Results

| FORMULA>>> | H &C Si Acrylic 10.00014 Gray in White Base | | | | | | | | | |
|---|---|---|---|---|---|---|---|---|---|---|
| SURFACE PREPARATION>>> | CURED AND SEALED | | | | | HARD TROWELED | | | | |
| CONCRETE PRETREATMENT>>> | H2O | CA | DW | C&P | HCl | H2O | CA | DW | C&P | HCl |
| water | 6 | 6 | 6 | 6 | 6 | 6 | 6 | 6 | 6 | 6 |
| Scott's Halts Plus 30-3-4 | 4 | 6 | 6 | 4 | 4 | 5 | 6 | 5 | 4 | 4 |
| 409 Cleaner | 6 | 6 | 6 | 6 | 6 | 6 | 6 | 6 | 6 | 6 |
| used oil/gas mix | 6 | 6 | 6 | 6 | 6 | 6 | 5 | 5 | 5 | 5 |
| brake fluid | 1 | 4 | 4 | 1 | 2 | 1 | 2 | 1 | 2 | 2 |
| windshield wiper fluid | 6 | 6 | 6 | 6 | 6 | 6 | 6 | 6 | 6 | 6 |
| auto trans fluid | 6 | 6 | 6 | 6 | 6 | 6 | 6 | 5 | 5 | 5 |
| antifreeze | 6 | 6 | 6 | 6 | 6 | 6 | 6 | 6 | 6 | 6 |
| conc. cold NaCl | 6 | 6 | 6 | 6 | 6 | 6 | 6 | 6 | 6 | 6 |
| conc. cold CaCl2 | 6 | 6 | 6 | 6 | 6 | 6 | 6 | 6 | 6 | 6 |
| 10% sulfuric acid | 6 | 6 | 6 | 6 | 6 | 6 | 3 | 6 | 6 | 6 |
| 10% sodium hydroxide | 3 | 6 | 6 | 6 | 6 | 3 | 4 | 6 | 6 | 6 |
| ethanol | 2 | 6 | 6 | 2 | 2 | 2 | 6 | 2 | 2 | 2 |
| mineral spirits | 6 | 6 | 6 | 3 | 6 | 6 | 6 | 6 | 5 | 5 |
| xylene | 1 | 1 | 2 | 1 | 1 | 1 | 1 | 1 | 1 | 1 |
| muriatic acid | 6 | 6 | 6 | 6 | 6 | 6 | 6 | 6 | 6 | 6 |
| overall score | 77 | 89 | 90 | 77 | 81 | 78 | 81 | 85 | 78 | 78 |
| excellence rating | 11 | 14 | 14 | 11 | 12 | 11 | 11 | 10 | 9 | 9 |

A number of embodiments of the invention have been described. Nevertheless, it will be understood that various modifications may be made without departing from the spirit and scope of the invention. Accordingly, other embodiments are within the scope of the following claims.

What is claimed is:

1. A concrete cleaning and preparation composition, comprising greater than about 4 wt. % urea hydrochloride, about 0.1 wt. % to about 4 wt. % of one or more glycol ethers, surfactant, and water, wherein the urea hydrochloride to surfactant ratio is, by weight, about 25:1 about 50:1, and wherein the pH of the composition is -0.04 to 0.72.

2. The composition of claim 1, wherein the glycol ethers to surfactant ratio is, by weight, about 5:1 or greater.

3. The composition of claim 1, further comprising:
one or more corrosion inhibitors, wherein the corrosion inhibitor to surfactant ratio is, by weight, from about 0.1:1 to about 20:1.

4. The composition of claim 2, further comprising one or more of a colorant, fragrance, alcohol, terpene hydrocarbon, di-basic ester, or petroleum distillate.

5. The composition of claim 1, wherein the glycol ethers to surfactant ratio is, by weight, from about 8:1 to about 12:1.

6. The composition of claim 1, wherein the one or more glycol ethers comprise dipropylene glycol methyl ether and propylene glycol n-butyl ether.

7. The composition of claim 5, wherein the dipropylene glycol methyl ether to propylene glycol n-butyl ether ratio is, by weight, from about 1.5:1 to about 3:1.

8. A concrete cleaning and preparation composition, comprising:
about 4 wt. % to about 33 wt. % urea hydrochloride;
about 0.02 wt. % to about 1 wt. % surfactant;
water; and
one or more glycol ethers present at a concentration from about 0.1 wt. % to about 4 wt.
wherein the composition etches a concrete surface, and wherein the pH of the composition is -0.04 to 0.72.

9. The composition of claim 8, wherein the one or more glycol ethers comprise dipropylene glycol methyl ether and propylene glycol n-butyl ether, and wherein, the dipropylene glycol methyl ether to propylene glycol n-butyl ether ratio is, by weight, from about 1.5:1 to about 3:1.

10. The composition of claim 8, further comprising one or more corrosion inhibitors present at a concentration from about 0.02 wt. % to about 1 wt. %.

11. The composition of claim 10, further comprising one or more of a colorant, fragrance, alcohol, terpene hydrocarbon, di-basic ester, or petroleum distillate.

12. The composition of claim 8, wherein the composition comprises about 5 wt. % to about 15 wt. % urea hydrochloride.

13. The composition of claim 8, wherein the composition comprises about 6 wt. % to about 12 wt. % urea hydrochloride.

14. The composition of claim 8, wherein the composition comprises about 8 wt. % to about 10 wt. % urea hydrochloride.

* * * * *